May 29, 1923.
A. K. TRENHOLME
SINGLE TUBE BICYCLE TIRE
Filed April 27, 1922
1,457,287
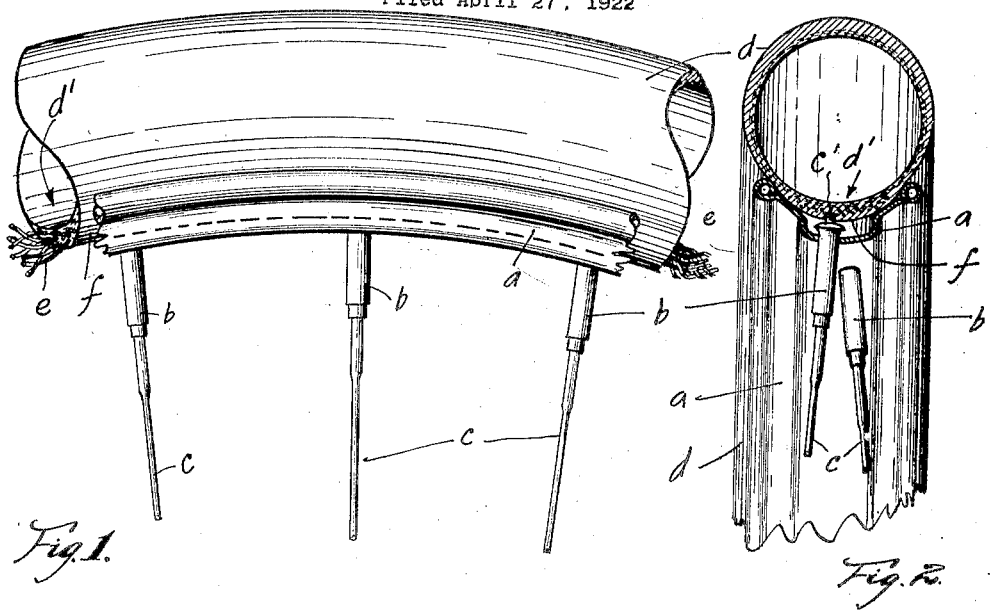
Fig. 1.
Fig. 2.
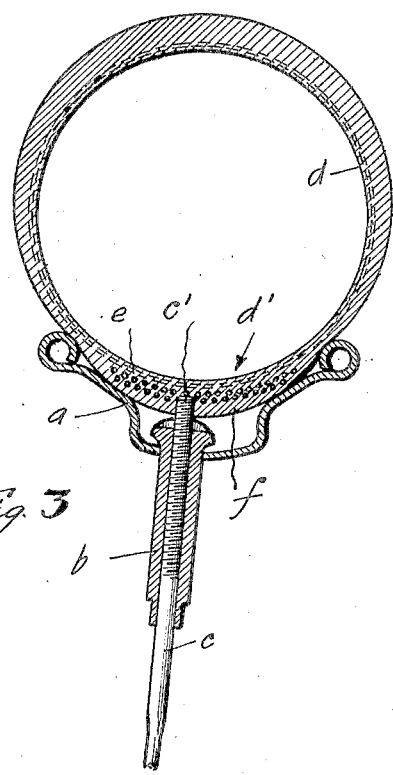
Fig. 3
Inventor:
Arthur K. Trenholme.
by Atty.

Patented May 29, 1923.

1,457,287

UNITED STATES PATENT OFFICE.

ARTHUR K. TRENHOLME, OF PORTLAND, OREGON.

SINGLE-TUBE BICYCLE TIRE.

Application filed April 27, 1922. Serial No. 556,946.

*To all whom it may concern:*

Be it known that I, ARTHUR K. TRENHOLME, a citizen of the United States, and a resident of Portland, county of Multnomah, and State of Oregon, have invented a certain new and useful Improvement in Single-Tube Bicycle Tires, of which the following is a specification.

My invention relates to the single tube bicycle tires. Ordinarily the tires of a bicycle wheel tend to shift around, that is longitudinally, on the wheel rim due to the weight of the rider compressing the tire a trifle, and in so doing moving the tire around on the wheel rim from time to time. Since there is a valve projecting from the casing thru the rim, said displacement of the parts frequently tears the valve off. This effect is so frequent as to prove a constant expense in bicycle repair work. In order to avoid such displacement of the tire on the rim it is customary to cement the tire on the rim by shellac or similar agent. But this is very unsatisfactory, because the cement lets loose after a time; sometimes in a very short while, when the tire is not kept properly inflated. Besides, when any repair work has to be done on the tire or rim or spokes of the wheel, the tire must be torn loose from the cement, and then cemented on the rim again, which cementing requires usually several hours before the wheel can be used without danger of the cement breaking.

By my improvement I provide mechanical means for holding the tire against shifting around on the wheel rim, without cementing the tire casing on the wheel rim.

My invention briefly stated, consists in providing that side of the tire seated on the wheel-rim with a reinforcement of wire cloth or other penetration-resisting material, and arranging the wire spokes of the wheel so as to project thru and beyond the exterior of the rim and bear against said reinforcement. When then, the tire is inflated the projecting spoke ends will be caused to form indentations in, and engage with the said reinforcement, and thus hold the tire against longitudinal movement on the wheel rim. Preferably, that wall portion of the tire casing which is seated on the wheel rim is thickened, so as to prevent the ends of the spoke from extending into the interior of the tire and puncturing it.

The construction and operation of my invention is illustrated in the accompanying drawings, in which:

Fig. 1 represents a section of a wheel-rim and its spokes, and also shows a section of the tire mounted on the rim, the tire being provided with the reinforcement above referred to;

Fig. 2 is a cross-section of the parts shown in Fig. 1, the cross section being taken between the two right hand spokes; and Fig. 3 is a larger scaled cross-section detail illustrating the principle of construction and operation of my invention.

The wheel rim $a$ is preferably made of the cross section illustrated in Figs. 2 and 3. The rim is provided in staggered arrangement with the usual nipples $b$, in which are threaded the wire spokes $c$, as more clearly shown in Fig. 3. The tire $d$ is preferably thickened at the side $d'$ which bears on the wheel-rim, and in such thickened portion is imbedded a reinforcement of wire-cloth $e$, or other penetration-resisting material adapted, however, to yield sufficiently to the pressure of the inner ends of the wire spokes to permit the latter to form indentations in the reinforcing material sufficiently to bring about an engagement of the interiorly projecting spoke-end $c'$ with the reinforcing material, substantially as diagrammatically illustrated in Figs. 2 and 3. These indentations in the reinforcing material are formed when the tire is inflated, and as a result the tire is then held against shifting longitudinally on the wheel-rim.

I do not consider it practical to imbed the said reinforcing material in the wall of a tire not made of increased cross section as at $d'$, because the projecting outer ends of the spokes might penetrate the wall of the tire sufficiently to puncture it. In short, in order to avoid puncturing the tire, the reinforcing element should be located a substantial distance from the inner face of the wall of the tire casing. When that wall portion which bears on the wheel rim is thickened in cross section, as described, the outer portion $f$ of the tire casing having the reinforcing element, forms a saddle, as it were, for the projecting outer ends of the spokes to seat on; said projecting ends penetrating the rubber wall of the tire casing until bearing on the reinforcing element, and the socket so formed in the outer rubber wall portion $f$ of the casing, also contributing to hold the tire against slipping on the wheel-rim.

Heretofore the projecting outer ends of the spokes were usually clipped off so as to prevent them from penetrating the tire casing and puncturing the same.

A further advantage of my invention is that while the ordinary tire casing has a tendency to stretch in service making the cementing of the tire on the rim very difficult and at times almost impossible, by my invention the wire cloth or reinforcing material serves to prevent the stretching of the tire casing to a considerable extent and thus also serves to keep the tire firmly in place on the wheel rim as long as the life of the tire.

I claim:

1. The combination of a wheel having spokes projecting thru and beyond its rim, a single piece tire, made of increased thickness on that side seated on said rim, and having therein imbedded a reinforcement of penetration resisting material, adapted to permit the projecting spoke ends to partially penetrate the walls of said tire, thereby to effect an engagement between said projecting spoke-ends and the said side of the tire casing, when the tire is inflated, to hold the tire against longitudinal movement on the wheel-rim.

2. The combination of a wheel having spokes projecting thru and beyond its rim, a single piece tire, having therein imbedded a reinforcement of penetration resisting material, adapted to permit the projecting spoke ends to partially penetrate the walls of said tire, thereby to effect an engagement between said projecting spoke-ends and the said side of the tire casing, when the tire is inflated, to hold the tire against longitudinal movement on the wheel rim.

ARTHUR K. TRENHOLME.